United States Patent
Kumar (10) Patent No.: US 8,212,532 B2
(45) Date of Patent: Jul. 3, 2012

(54) METHOD AND SYSTEM FOR CONTROL OF A VEHICLE ENERGY STORAGE DEVICE

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 159 days.

(21) Appl. No.: 12/179,188

(22) Filed: Jul. 24, 2008

(65) Prior Publication Data
US 2010/0019726 A1    Jan. 28, 2010

(51) Int. Cl.
*H02J 7/00* (2006.01)
(52) U.S. Cl. .......................... 320/155; 320/125; 320/132
(58) Field of Classification Search .................. 320/109, 320/133, 153, 155
See application file for complete search history.

(56) References Cited

U.S. PATENT DOCUMENTS

| | | | |
|---|---|---|---|
| 4,435,675 A | 3/1984 | Adams | |
| 5,349,535 A | 9/1994 | Gupta | |
| 5,373,195 A | 12/1994 | De Doncker et al. | |
| 5,467,006 A * | 11/1995 | Sims | 237/5 |
| 5,623,194 A | 4/1997 | Boll et al. | |
| 5,659,240 A | 8/1997 | King | |
| 5,731,685 A * | 3/1998 | Jones | 320/150 |
| 5,778,326 A | 7/1998 | Moroto et al. | |
| 6,265,847 B1 | 7/2001 | Goerke | |
| 6,281,598 B1 | 8/2001 | King et al. | |
| 6,291,973 B1 | 9/2001 | Lee | |
| 6,362,596 B1 * | 3/2002 | Brotto | 320/106 |
| 6,470,983 B1 | 10/2002 | Amano et al. | |
| 6,507,127 B1 | 1/2003 | Amano et al. | |
| 6,515,456 B1 * | 2/2003 | Mixon | 320/160 |
| 6,771,047 B1 | 8/2004 | Ogonowsky | |
| 7,049,792 B2 | 5/2006 | King | |
| 7,078,877 B2 | 7/2006 | Salasoo et al. | |
| 7,525,290 B2 * | 4/2009 | Miyata | 320/160 |
| 2002/0145404 A1 * | 10/2002 | Dasgupta et al. | 320/116 |
| 2002/0156537 A1 * | 10/2002 | Sakakibara et al. | 700/1 |

FOREIGN PATENT DOCUMENTS

| | | |
|---|---|---|
| GB | 2 273 614 | 6/1994 |
| WO | 02/081255 | 10/2002 |

OTHER PUBLICATIONS

ISA European Patent Office, International Search Report of PCT/US2009/049537, Sep. 23, 2009, WIPO, 4 pages.
Salasoo, Lembit et al., "Method and System for Extending Life of a Vehicle Energy Storage Device," U.S. Appl. No. 12/179,199, filed Jul. 24, 2008, 45 pages.
Office action of U.S. Appl. No. 12/179,199, Mail Date: Feb. 28, 2011, Response to Office action not yet submitted, 16 pages.

* cited by examiner

*Primary Examiner* — Ramy Ramadan
(74) *Attorney, Agent, or Firm* — Shawn McCllntic; Alleman Hall McCoy Russell & Tuttle LLP (57) ABSTRACT

Systems and methods are described for controlling a power transfer rate in to and/or out of an energy storage device on-board a vehicle, such as a locomotive, during a power transfer opportunity. In one example, the method includes adjusting the power transfer rate based on a predetermination of a duration of the power transfer opportunity to match a duration of power transfer to the duration of the opportunity and achieve a specified state of charge.

8 Claims, 3 Drawing Sheets

METHOD AND SYSTEM FOR CONTROL OF A VEHICLE ENERGY STORAGE DEVICE

FIELD

The subject matter disclosed herein relates to a method and system for improving the power transfer profile of a vehicle energy storage device to thereby improve the operating life of the device.

BACKGROUND

Electric and hybrid electric vehicles, such as locomotives, operate with on-board rechargeable electrical energy storage devices. The energy storage devices may include one or more types of batteries, super-capacitors, and flywheel systems.

During operation, the energy storage devices experience frequent cycles of periodic charging and discharging. Further, the operating life and performance characteristics of such devices can be affected by the rate and depth of charging/discharging and/or the current level at which the power transfer occurs. Related changes in the device's state of charge and temperature can also affect its life and performance characteristics. For example, use of faster and deeper rates of power transfer and higher current (and/or voltage) levels during bulk charging/discharging events can adversely affect the operating life and storage capacity of an energy storage device. The age of the device, frequency of usage, state of energy storage, and temperature of storage are some additional parameters affecting its performance. Reduced performance of electrical energy storage devices in turn may affect the fuel efficiency of the vehicle system in which they are used.

BRIEF DESCRIPTION OF THE INVENTION

Methods and systems are provided for controlling a power transfer rate in to and/or out of a vehicle energy storage device, during a power transfer opportunity. In one embodiment, the method comprises adjusting the power transfer rate based on a predetermination of a duration of the power transfer opportunity to match a duration of the opportunity and achieve a specified state of charge.

For example, when it is predetermined that a charging opportunity is of a longer duration, the energy storage device may be charged at a lower rate (e.g., with a lower charging current), than when it is predetermined that a charging opportunity is of a shorter duration. Analogously, the discharging rate for an energy storage device may be appropriately adjusted responsive to a known duration of an upcoming discharging opportunity. In this way, it is possible to take advantage of a priori information about the charging/discharging opportunity (e.g., information known, deduced, and/or estimated before the charging/discharging opportunity) to better utilize longer charging/discharging durations through a lower charging/discharging rate. The longer charging/discharging time can further augment battery life and performance due to ancillary benefits such as reduced overall losses. In one example, overall losses can be reduced due to a direct reduction in resistive heat losses (that is energy loss incurred from $I^2R$ power loss). In another example, the reduction in overall losses (resistive or otherwise) enables a reduction in the amount of cooling power required, and other thermal management requirements. Such synergistic benefits of the reduction in overall losses related to time extension of the charging/discharging opportunity. Taken together, such operation thereby provides a more efficient power transfer and reduces degradation of the energy storage device in the vehicle, while still reaching the desired state of charge at the conclusion of the opportunity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 2:
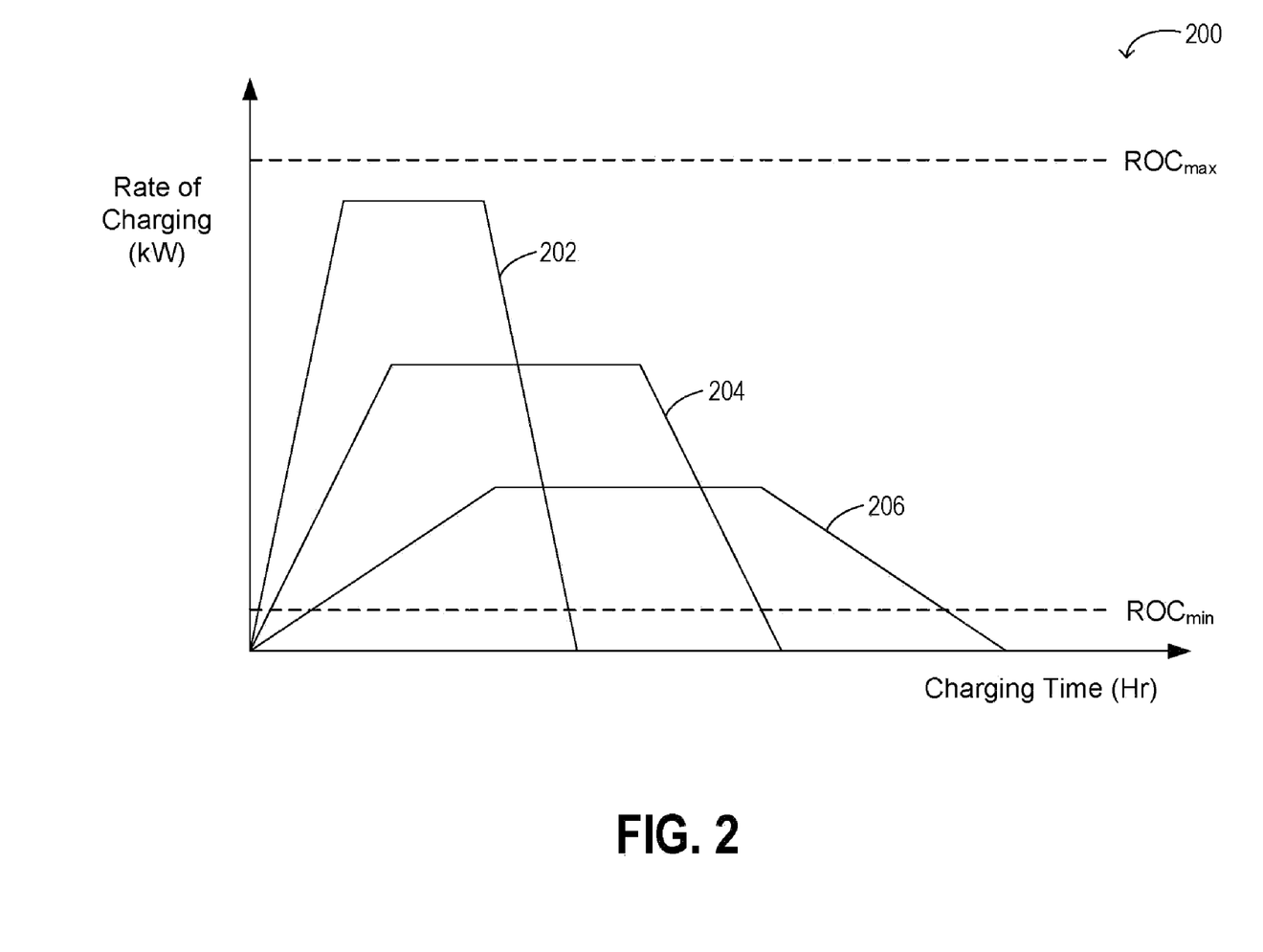
FIG. 2 shows an example map of alternate charging/discharging profiles for a given desired state of charge.
Figure 3:
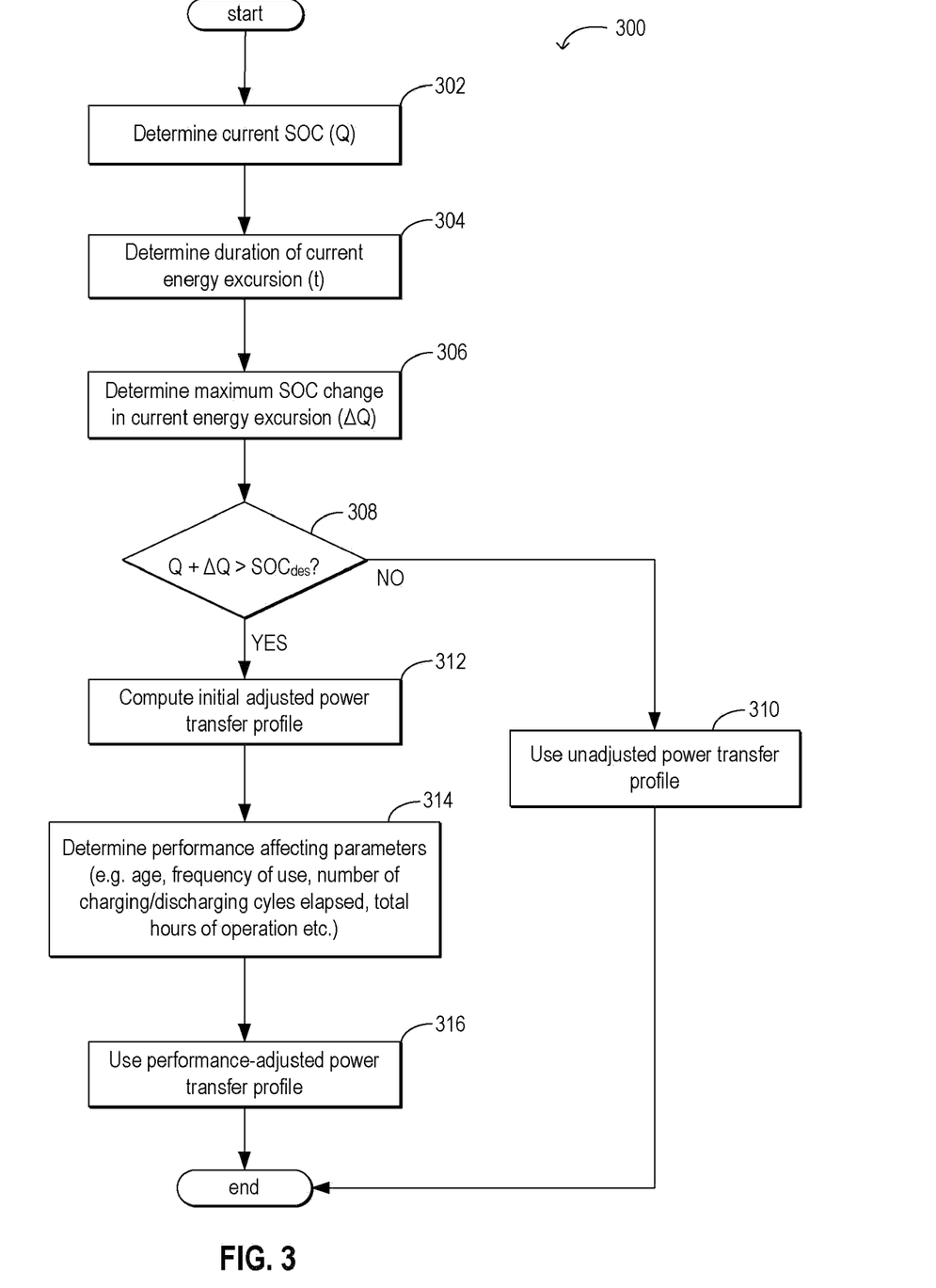
FIG. 3 shows a high level flow chart for controlling the power transfer profile of an energy storage device according to the present disclosure.

Vehicles, such as locomotives, operating with rechargeable electrical energy storage devices may be configured with integrated energy management systems that control power transfer rates to and from the energy storage device. The power transfer rate may be controlled based not only on the operating condition of the energy storage device, but also responsive to charging/discharging opportunities available during a mission. One example is illustrated with reference to FIG. 1 wherein an energy management system monitors the operating conditions of a locomotive's on-board electrical energy storage device, and based on the duration of the power transfer opportunity, adjusts the charging/discharging profile so as to enable an efficient power transfer. In doing so, the operating life of the energy storage device may be extended while reducing the failure rate. In the event of multiple energy storage banks, the power transfer profile may be customized responsive to the age, capacity, performance, state of storage, temperature, and other operating characteristics of each specific storage bank. As illustrated in FIG. 2, the system may choose from a variety of charging/discharging profiles to attain the same final state of charge. The selected profile may be determined by performing a power transfer profile routine, for example as depicted in FIG. 3, so that the power transfer may take advantage of a priori information about the duration of the power transfer opportunity. By customizing the operation of the energy storage device responsive to the device's operating condition and predetermined information about the upcoming duration of the charging/discharging opportunity, the efficiency of power transfer to/from the energy storage device may be enhanced while improving the operating life of the device and reducing the failure rate.

Figure 1:
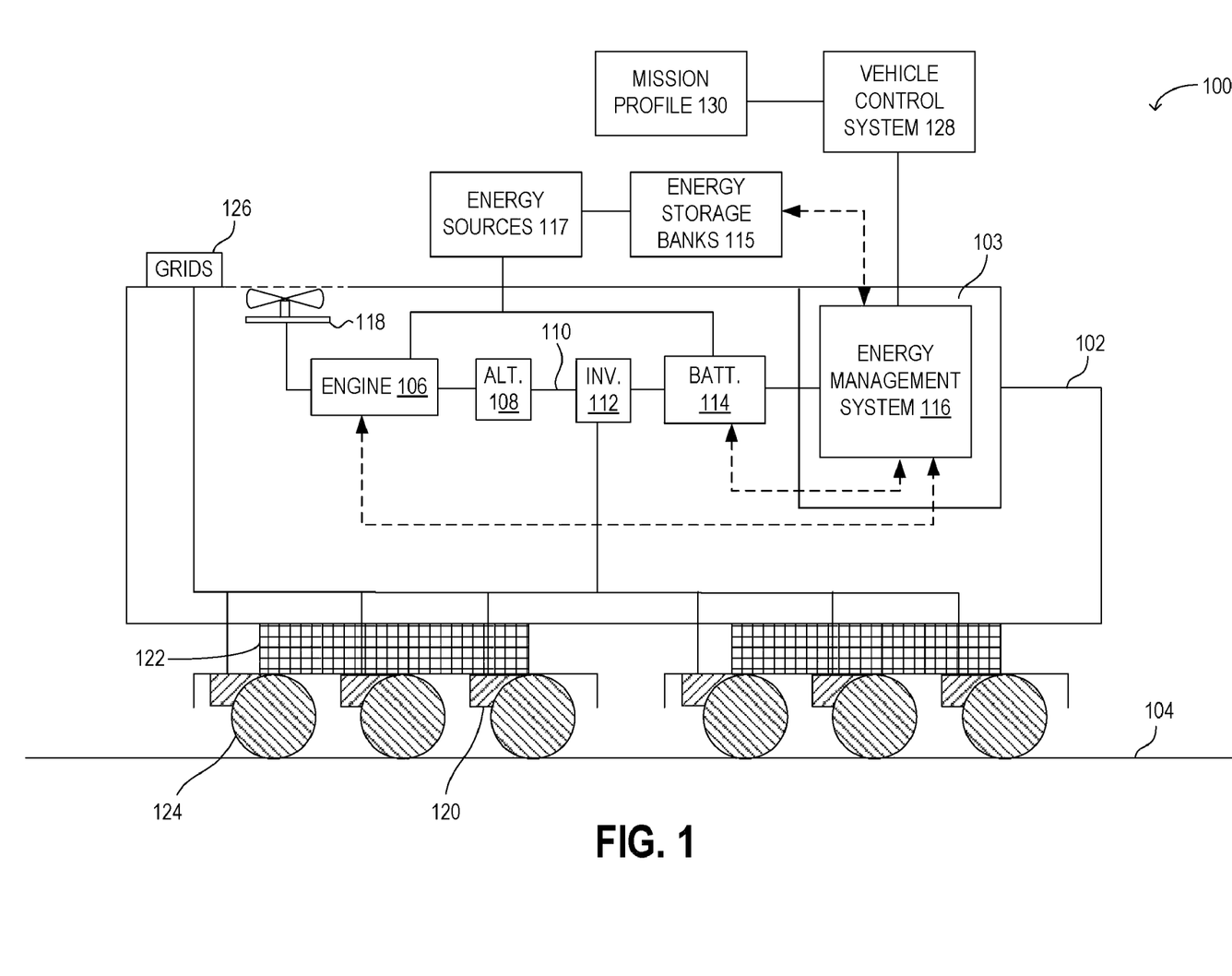
FIG. 1 shows an example embodiment of a diesel-electric locomotive with an energy management system according to the present disclosure.

FIG. 1 is a block diagram of an example hybrid vehicle system, herein depicted as locomotive 100, configured to run on track 104. As depicted herein, in one example, the locomotive is a diesel electric vehicle operating a diesel engine 106 located within a main engine housing 102. However, in alternate embodiments of locomotive 100, alternate engine configurations may be employed, such as a gasoline engine or a biodiesel or natural gas engine, for example. It will be appreciated that while in the depicted example, the vehicle is a locomotive, the vehicle may alternatively be an off-highway vehicle (OHV) such as a large excavator, excavation dump truck, and the like. Further, the vehicle system may be a hybrid electric propulsion system such as may be used in marine and stationary applications.

Locomotive operating crew and electronic components involved in locomotive systems control and management, such as energy management system 116, may be housed within a locomotive cab 103. Energy management system 116 may comprise a plurality of microprocessors and/or computers. Energy management system 116 may communicate with a vehicle control system 128. Vehicle control system 128 may be an on-board control system also located in locomotive cab 103. Alternatively, the vehicle control system may be remotely located. Vehicle control system 128 and/or energy management system 116 may further include a position identification system, such as a global positioning system (GPS), mission plan, enabling the energy management system to be aware of the current mission profile.

The diesel engine 106 generates a torque that is transmitted to an alternator 108 along a drive shaft (not shown). The generated torque is used by alternator 108 to generate electricity for subsequent propagation of the vehicle. Locomotive engine 106 may be operated based on operational demand. The electrical power generated in this manner may be referred to as the prime mover power. Auxiliary alternators generating smaller amounts of power (auxiliary power) for auxiliary components such as air conditioning, heating, etc., may be optionally provided in alternate embodiments of locomotive 100. The electrical power may be transmitted along an electrical bus 110 to a variety of downstream electrical components. Based on the nature of the generated electrical output, the electrical bus may be a direct current (DC) bus (as depicted) or an alternating current (AC) bus.

Alternator 108 may be connected in series to one or more rectifiers (not shown) that convert the alternator's electrical output to DC electrical power prior to transmission along the DC bus 110. Based on the configuration of a downstream electrical component receiving power from the DC bus 110, an inverter 112 may be used to convert the DC electrical power to AC electrical power. In one embodiment of locomotive 100, a single inverter 112 may supply AC electrical power from the DC bus 110 to a plurality of components. In an alternate embodiment, each of a plurality of distinct inverters may supply electrical power to a distinct component. It will be appreciated that in still further embodiments, the locomotive may include one or more inverters connected to a switch that may be controlled to selectively provide electrical power to different components connected to the switch.

A traction motor 120, mounted on a truck 122 below the main engine housing 102, may receive electrical power from alternator 108 via DC bus 110 to provide tractive power to propel the locomotive. As described herein, traction motor 120 may be an AC motor. Accordingly, an inverter paired with the traction motor may convert the DC input to an appropriate AC input, such as a three-phase AC input, for subsequent use by the traction motor. In alternate embodiments, traction motor 120 may be a DC motor directly employing the output of the alternator after rectification and transmission along the DC bus or through appropriate DC/DC converters. One example locomotive configuration includes one inverter/traction motor pair per wheel axle 124. As depicted herein, six inverter-traction motor pairs are shown for each of six axle-wheel pairs of the locomotive. In alternate embodiments, locomotive 100 may be configured with four inverter/traction motor pairs, for example. It will be appreciated that alternatively a single inverter may be paired with a plurality of traction motors.

Traction motor 120 may also be configured to act as a generator providing dynamic braking to brake locomotive 100. In particular, during dynamic braking, the traction motor may provide torque in a direction that is opposite from the rolling direction thereby generating electricity. At least a portion of the generated electrical power may be routed to an electrical energy storage device, depicted herein as battery 114. When the energy storage device is unable to receive and/or store all of the dynamic braking energy, the excess energy may be routed to a grid of resistors 126 and dissipated as heat. In one example, the grid includes stacks of resistive elements connected in series directly to the electrical bus. The stacks of resistive elements may be positioned proximate to the ceiling of main engine housing 102 in order to facilitate air cooling and heat dissipation from the grid. In addition, during periods when the engine 106 is operated such that it provides more energy than is needed to drive the traction motors 120, the excess capacity (also referred to as excess prime mover power) may be optionally stored in battery 114. Thus, the energy storage device may be charged at times other than when the traction motors are operating in the dynamic braking mode. Air brakes (not shown) making use of compressed air may also be used by locomotive 100 as part of a vehicle braking system.

A multitude of motor driven airflow devices may be operated for temperature control of locomotive components. For example, a traction motor blower to cool traction motor 120 during periods of heavy work, an alternator blower to cool alternator 108, and a grid blower to cool the grid of resistors 126. Each blower may be driven by an AC or DC motor and accordingly may be configured to receive electrical power from DC bus 110 by way of a respective inverter.

Engine temperature is maintained in part by a radiator 118. Water may be circulated around engine 106 to absorb excess heat and contain the temperature within a desired range for efficient engine operation. The heated water may then be passed through radiator 118 wherein air blown through the radiator fan may cool the heated water. A cooling system comprising a water-based coolant may optionally be used in conjunction with the radiator 118 to provide additional cooling of the engine 106. The airflow devices and/or cooling system may also be used to cool the energy storage devices.

A system electrical energy storage device, depicted as battery 114 in this example, may also be linked to DC bus 110. A DC-DC converter (not shown) may be configured between DC bus 110 and battery 114 to allow the high voltage of the DC bus (for example in the range of 1000V) to be stepped down appropriately for use by the battery (for example in the range of 12-75V). In the case of a hybrid locomotive, the on-board electrical energy storage device may be in the form of high voltage batteries, such that the intermediate DC-DC converter may be omitted.

Battery 114 may be charged by running engine 106. Alternatively, battery 114 may be charged during regenerative braking. The electrical energy stored in the battery may be used during a stand-by mode of engine operation to operate various electronic components such as lights, on-board monitoring systems, microprocessors, processor displays, climate controls, and the like. In hybrid locomotives, or other hybrid electric propulsion systems, the electrical energy stored in the battery may also be used to motor the vehicle. Additionally, battery 114 may be used to provide an initial charge to start-up engine 106 from a shutdown condition.

While in the depicted example, the energy storage device includes a battery, in alternate embodiments, the electrical energy storage device may be an energy storage system comprising a plurality of energy storage banks. The storage banks may include, for example, super-capacitors or ultra-capacitors, flywheels, batteries, or a combination thereof. The storage banks may be used separately or in any combination. When in combination, the different storage banks may provide synergistic benefits not realized with the use of any single energy storage device. For example, a flywheel system can store electrical energy relatively fast but may be relatively limited in its total energy storage capacity. On the other hand, a battery system stores energy relatively slowly but may be configured with a large total storage capacity. Thus, when combined, the flywheel may capture the dynamic braking energy that cannot be timely captured by the battery, while the energy stored in the flywheel may thereafter be used to charge the battery. In this way, the overall storage and capture capabilities of the energy storage system are extended beyond the limits of either the flywheel or the battery operating alone. In alternate embodiments, the energy storage device may also be incorporated with a plurality of energy storage banks of the same or different type to meet large power and/or energy requirements. In one example, the energy storage device includes a plurality of batteries, such as for example a plurality of lithium ion batteries.

It will be appreciated that the plurality of energy storage banks may be located on the same locomotive or on an alternate locomotive. Further still, alternate energy sources 117 may be used to transfer energy to the on-board energy storage device, such as battery 114. The alternate energy sources 117 and/or the energy storage banks may also be charged by the engine and managed by energy management system 116.

The energy rating of the battery, as indicated in ampere-hours or kilowatt-hours, may typically reflect the total energy stored in the battery, and not the useable energy. As such, a lower limit for the battery's state of charge (SOC), alternatively represented as a depth of discharge (DOD), may reflect the actual useable energy. In one example, the DOD may be 80% indicating that only 80% of the total energy rating may be useable. A charging/discharging rate and/or a power transfer rate to and/or from battery 114 may be controlled by the energy management system 116.

Energy management system 116 may additionally include power electronics, DC/DC converters or bi-directional boost converters, electrical coupling devices, contactors, and diodes. The bi-directional boost converter (not shown) that may be included in the energy management system 116 decouples the voltage of an alternate energy storage system, for example ultracapacitors or a second battery in an energy storage system comprised of a plurality of energy storage devices, from the battery 114 voltage.

The energy management system 116 may be configured to receive data pertaining to the battery's condition, including but not limited to a battery state of charge (SOC), a battery temperature and a temperature gradient, a frequency of usage, a number of charging/discharging cycles that have elapsed, a power transfer current and voltage, total operating hours in charge/discharge mode, number of vehicle missions completed, vehicle distance traveled, elapsed time in operation, and the like. Further, an associated position identification system, such as a GPS, or input from Trip Optimizer™ software (see U.S. Publication No. 20070219680A1 dated Sep. 27, 2007) may provide the energy management system with a detailed profile of the current mission route, including but not limited to grades, speed limits, curvature, and altitude. Alternatively, such data may be determined from operating parameters such as vehicle tonnage, speed, payload amount, or other statistical inputs. Further still, such data may be determined based on a time of operation, for example a day versus a night operation, and/or a high traffic time versus a low traffic time operation. From the received data, the energy management system 116 may be able to compute a detailed profile of the current charging/discharging opportunity. The power transfer rate in to and/or out of the vehicle energy storage device may be adjusted by the energy management system during a power transfer opportunity based on a predetermination of a duration of the power transfer opportunity so as to match a duration of power transfer to the duration of the opportunity and still achieve a specified state of charge. The power transfer rate may be further adjusted responsive to an operating condition of the energy storage device. In one example, the operating condition is an age of the device. In another example, the operating condition is a temperature of the device. It will be appreciated that when operating with a plurality of energy storage banks, each of differing age, configuration, life to rate transfer functions (e.g., the relationship between battery lift reduction and charging rate, which may be non-linear), and related characteristics, the power transfer rate in to and/or out of and/or in between the banks may be adjusted responsive to the above characteristics of each involved bank. As such, the charging rate of individual batteries or battery banks may be adjusted based on such characteristics, as well as an estimated duration of the charging opportunity. A maximum and minimum charging/discharging rate may accordingly be assigned responsive to the age, frequency of usage, efficiency, and other operating parameters of the battery. Optionally, or additionally, the same parameters may be used to assign a maximum and minimum threshold for a desired state of charge. As the mission and/or battery operating parameters change, the charging/discharging profile may be revised and updated.

FIG. 2 shows an example map 200 depicting alternate charging profiles for a given desired state of charge. As shown, map 200 comprises three charging profiles 202, 204 and 206 for a given battery. The battery may have a preset upper and lower threshold for a rate of charging ($ROC_{max}$ and $ROC_{min}$ respectively). If the battery is charged above $ROC_{max}$, over-heating and subsequent degradation of battery components may ensue, leading to degraded battery performance. If the battery is charged below $ROC_{min}$, accelerated charge dissipation may ensue, adversely affecting the battery's capacity. It will be appreciated that a similar map may be computed for alternate discharging profiles for a given desired state of charge. The different charging profiles (202, 204, 206) differ principally in their rates of charging, and the duration of charging. It will be appreciated however that all three profiles provide the same final state of charge, as may be calculated by the area under each curve. Charging profile 202 has the highest charging rate (as represented by the highest magnitude), however it is charged for the shortest period of time. As one example, the energy storage device may be charged at 1000 kW for 15 mins to generate 250 kWh of charge. As such, charging profile 202 may be the default (unadjusted) maximum power transfer rate profile. Charging profile 202 may be selected when, for example, the current power transfer opportunity is of a shorter duration and/or when the battery has not aged much. Alternatively, charging profile 202 may be selected when the change in rate of charging does not produce significant benefits such as a significant failure rate reduction, life extension, cooling power reduction, or voltage/current stress reduction on associated components. As we move towards profile 206, via 204, the charging rate decreases and the charging duration is increased. As one example, the energy storage device may be charged at 600 kW for 25 mins (as an example of profile 204) or at 250 kW for 60 mins (as an example of profile 206). Adjusted charging profiles 204 or 206 may be selected when, for example, the current power transfer opportunity is of a longer duration and/or when the battery has aged and thus developed a high internal resistance such that charging at higher rates is detrimental to the battery's life. Alternatively, such a power transfer profile may be selected when reducing the rate decreases the failure rate of the device, reduces the rate of device degradation and/or improves the life of the device. It will be appreciated that while the depicted example indicates a common upper and lower limit for the rate of charging (ROC) for the different charging profiles, in alternate embodiments, each charging profile may have independently assigned upper and lower limits for the rate of charging. The upper and lower thresholds for the desired state of charge may be adjusted responsive to, for example, a temperature, SOC and age of the energy storage device. Alternatively, the limits may be assigned responsive to the device's operating conditions. In one example, as a temperature or age of the device increases, the upper threshold may be reduced and the lower threshold may be increased for the specified state of charge, thereby averting excess heat generation in the device. Alternatively, the maximum desired SOC may be lowered. When the energy storage device includes a plurality of energy storage banks, the maximum threshold for ROC and/or SOC for each individual bank may be independently adjusted responsive to the age, temperature, frequency of usage, and other performance affecting characteristics of the bank. In one example, the ROC and/or SOC for one bank may be increased while that for another bank may be decreased to produce a net positive benefit. For example, when operating an energy storage device with a plurality of battery based energy storage banks, the batteries of differing age, the power usage of the younger battery may be increased while that of the older battery may be decreased. Further, the power transfer rate between, and/or to and from, at least one of the plurality of energy storage banks may be adjusted responsive to an operating condition of the energy storage bank. In one example, this may be achieved by reducing the power transfer rate of the device as the temperature of the device increases, for the duration of the power transfer. In the same way, when operating with a plurality of energy storage banks differing in their temperature conditions, the power transfer profile of the banks may be adjusted responsive to each bank's temperature. For example, the power usage/transfer of a hotter bank may be reduced while increasing the power transfer usage of a cooler bank.

In this way, the power transfer profile of the energy storage device may be adjusted to maximize power transfer for the entire duration of the current power transfer opportunity. By reducing the frequency of power transfer at the maximum threshold of ROC, and by prolonging the duration of the energy excursion (when possible based on a priori information) an efficient power transfer may be achieved while reducing the failure rate and improving the operating life of the storage device.

FIG. 3 depicts a charging/discharging profile routine 300 that may be performed by a microprocessor of the energy management system 116, or a locomotive control system, to determine a power transfer profile for the battery. The routine allows a desired SOC to be achieved at the end of the current power transfer opportunity, by adjusting the power transfer rate and/or power level at the start of the power transfer opportunity. In one example, the current power transfer opportunity is a long-duration charging opportunity. Herein charging at the maximum current level ($ROC_{max}$) for the entire duration of the charging opportunity would result in earlier ending of the charging. In other words, when charging at the maximum current level ($ROC_{max}$), the desired state of charge may be attained in a fraction of the estimated duration of the charging opportunity. Accordingly, the charging rate may be lowered and the duration of charging may be increased to fill the estimated duration of the charging opportunity. Thus, the desired state of charge may be achieved closer to the actual end of the charging opportunity, when charging at the adjusted lower rate.

In another example, the current power transfer opportunity is a short-duration charging opportunity wherein charging at the maximum current level for the duration would not result in overcharging of the battery. Herein, the power transfer profile may remain unadjusted and may be maintained at the (default) maximum threshold level such that the desired state of charge may be attained at the end of the short duration, but not earlier. In this way, the amount of energy captured during either charging opportunity may be maximized while enabling an efficient energy transfer. Such a method also enables the battery life to be improved. While the depicted examples show attainment of a desired SOC by the end of the charging opportunity, it will be appreciated that in alternate embodiments, the desired SOC may be attained before the end of the current power transfer opportunity if such an operation provides additional benefits. In one example, additional benefits may be achieved due to the presence of constant power dissipation in interface devices, such as diodes.

The power transfer opportunity may be of two kinds, namely charging or discharging opportunity. The energy management system 116 may be configured to specify where the discharging energy is to be directed during active operation. In one example, it may be desirable to apply the discharging energy to motoring the vehicle. In another example, when operating with multiple energy storage banks, it may be more desirable to store the energy discharged from one bank in an alternate bank. In another example, when no alternate option is available, the discharging energy may be dissipated through the grid of resistors. The energy management system may also specify where the charging energy is obtained from. While in one example, the charging energy may be obtained from regenerative braking energy (in bursts), in alternate examples, the charging energy may be obtained from the engine or, in a more controlled manner, from another available energy storage bank.

At 302, the battery's current SOC (Q) is determined. This may be estimated based on, but not limited to, specific gravity measurements of the battery electrolyte (for example in lead acid batteries), voltage and/or current measurements, cell impedance measurements, or a combination thereof. Alternatively, the SOC determination may be inferred from an estimate of the running time of the battery, the distance travelled by the vehicle, or other appropriate parameters. At 304, the duration of the current power transfer opportunity (herein also referred to as the energy excursion, "t") is determined. At 306, a maximum change in the SOC ($\Delta Q$) in the current energy excursion may be determined. The energy management system may strive to compute a change in the SOC with the largest magnitude. As such, $\Delta Q$ represents an amount of charge by which the battery state could be changed if the battery accepted the maximum current or power profile that the vehicle system could supply for the duration of the current energy excursion. Further, if the current power transfer opportunity is of the charging kind, then $\Delta Q$ may be assigned a positive value. If the current power transfer opportunity is of the discharging kind, then $\Delta Q$ may be assigned a negative value.

In one example, the duration of the current energy excursion and the maximum change in the SOC may be determined based on a history and/or statistical analysis of the same vehicle when previously traversing the same mission. Alternatively, it may be based on the history of the same vehicle when previously traversing similar missions. It will be appreciated that in alternate embodiments, the maximum change in the SOC may be computed based on the history of other vehicles traversing the same mission, or based on a statistical average of other vehicles traversing similar missions. The database or schedule of route profiles may include details pertaining to grades, speed limits, altitudes and curvatures. The history and relevant statistical data may be pre-computed and available in a database, or a lookup table, easily accessible by the energy management system en route the mission. By comparing the current locomotive position to the database or lookup table, the duration of the current power transfer opportunity may be determined. It will be appreciated that in lieu of historical and statistical data, the duration may be based on predicted power usage.

The maximum change in the SOC may be computed based on similar data. Additional data that may be considered while computing $\Delta Q$ may include the vehicle's payload, tare weight, mean fuel consumption, mission terrain, location, speed limits, desired speed profile, traffic congestion parameters, or any combination thereof. A buffer time may be subtracted from the calculated duration of the charging/discharging opportunity to account for variability between the current excursion and the database.

At 308, it is determined whether charging (or discharging) at the maximum current level ($ROC_{max}$), that is the default power transfer profile, for the entire duration ("t") of the current power transfer opportunity would result in overcharging (or over-discharging) of the battery. In one example this may be determined by comparing the sum of the current SOC and the maximal change in the SOC (that is $Q+\Delta Q$) with the desired state of charge ($SOC_{des}$) thresholds ($SOC_{max}$ for a charging event, $SOC_{min}$ for a discharging event, such that $SOC_{max} \geq SOC_{des} \geq SOC_{min}$). If no over-charging or over-discharging is expected, then at 310, the unadjusted (maximum) power transfer profile may be used.

If at 308 it is determined that over-charging (or over-discharging) may occur, then at 312, an initial adjusted power transfer profile may be computed, to avoid overshooting the target SOC. As previously elaborated in FIG. 2, a power transfer rate may be selected based on the duration of the energy excursion and the desired final SOC. Specifically, adjusting the power transfer rate includes, as the duration of the power transfer opportunity increases, reducing the power transfer rate while increasing the duration of power transfer to substantially fill the predetermined duration of the power transfer opportunity, and further, as the duration of the power transfer opportunity decreases, increasing the power transfer rate while decreasing the duration of power transfer to substantially fill the predetermined duration of the power transfer opportunity.

In one example, the charging profile may be accurately computed and adjusted to a lower level until the target SOC is delivered, as depicted in FIG. 2. In another example, the current profile reduction may not be accurately computed to meet the target SOC exactly, but instead the maximum current profile may be reduced by an approximate amount, such as a predetermined amount or by a predetermined factor. The predetermined amount or factor may have been assigned based on details in the history database of the vehicle and/or the mission.

At 314, additional performance affecting parameters of the battery may be determined so that the power transfer rate may be further adjusted responsive to an operating condition of the energy storage device. These may include, but not be limited to, an age of the device, an operating temperature of the device, the frequency of usage, the number of charging/discharging cycles that have elapsed, the total hours of operation of the battery, and combinations thereof. In one example, the battery may be an old battery. The loss of performance in aged batteries is often due to incremental damage sustained during each operational cycle. When the battery ages, the internal resistance grows and thus for the same state of charge and the same current level, an aged battery tends to have higher heat generation. Thus, it may be desirable to assign a lower $ROC_{max}$ and a higher $ROC_{min}$ and to accordingly further lower the power transfer rate of the battery. Compensation factors may be computed for each individual performance affecting parameter. Alternatively, pre-computed compensation factors may be read from a lookup table configured in the energy management system. Accordingly, at 316, while considering the compensation factors of the performance affecting parameters, a performance adjusted power transfer profile may be computed and used for the duration of the power transfer opportunity.

In this way, by applying an adjusted less intense power transfer profile, a number of benefits may be achieved. Specifically, an efficient energy transfer, an extension of battery life, a reduction in heating of battery components, and a reduction in the stress on other vehicle system components may be achieved through the use of a sub-maximal current profile.

Further, by adjusting the power transfer profile of the energy storage device during a power transfer opportunity, based on a priori knowledge of the duration of the charging opportunity, an efficient power transfer may be achieved. By adjusting the power transfer profile while compensating for performance affecting parameters such device age, temperature, capacity and other operating characteristics, the operating life of the battery may be extended and the performance improved.

Though exemplary embodiments of the present invention are described herein with respect to locomotives and other vehicles, it is also applicable to powered systems generally, including stationary power generation systems. Towards this end, when discussing a specified mission, this includes a task or requirement to be performed by the powered system. In the case of stationary applications, e.g., a stationary power generation station having one or more generators, or a network of power generation stations, a specified mission may refer to an amount of wattage or other parameter or requirement to be satisfied by the power generation station(s), alone or in concert, and/or estimated or known opportunities to store excess power from a power grid, electrical bus, or the like. In the case of a diesel-fueled power generation system (e.g., a diesel generator system providing energy to an electrical energy storage system), operating conditions may include one or more of generator speed, load, fueling value, timing, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling a peak power transfer rate in to and/or out of a vehicle energy storage device, during a power transfer opportunity, the method comprising:
adjusting the peak power transfer rate of the vehicle energy storage device based on a predetermination of a duration of the power transfer opportunity to match a duration of power transfer to the duration of the opportunity and achieve a specified state of charge, wherein the adjustment includes reducing the peak power transfer rate while increasing the duration of power transfer, as the duration of the power transfer opportunity increases, to substantially fill the entire predetermined duration of the power transfer opportunity such that a desired state of charge is attained,
wherein the adjusting of the peak power transfer rate includes operating with a first peak rate during a first power transfer opportunity of a first duration, a second peak rate during a second power transfer opportunity of a second duration, the second duration longer than the first duration, the second peak rate smaller than the first peak rate, and a third peak rate during a third power transfer opportunity of a third duration, the third duration longer than the first and second durations, the third peak rate smaller than the first and second peak rates, and where the energy storage device is an energy storage system comprising a plurality of energy storage banks; and
adjusting the peak power transfer rate of at least one of the plurality of energy storage banks responsive to an operating condition of the energy storage device, where the operating condition is an age of the device.

2. The method of claim 1 further comprising: adjusting an upper and a lower threshold for the desired state of charge responsive to a temperature and age of the energy storage device.

3. A method for controlling a power transfer rate in to and/or out of a vehicle energy storage device, during a power transfer opportunity, the method comprising:
adjusting the power transfer rate of the vehicle energy storage device based on a predetermination of a duration of the power transfer opportunity to match a duration of power transfer to the duration of the opportunity and achieve a specified state of charge, wherein the adjustment includes reducing the power transfer rate while increasing the duration of power transfer, as the duration of the power transfer opportunity increases, to substantially fill the predetermined duration of the power transfer opportunity; and
adjusting an upper and a lower threshold for a desired state of charge responsive to a temperature and age of the energy storage device, wherein adjusting an upper and a lower threshold includes, as a temperature or age of the device increases, reducing the upper threshold and increasing the lower threshold for the specified state of charge.

4. A system for a vehicle, comprising:
an energy storage device; and
a control system configured to,
during a first power transfer opportunity with a first predetermined duration of the power transfer opportunity, where the energy storage device is at a first age and a first temperature, transfer power in to and/or out of the energy storage device with a first peak power transfer rate for a first duration of power transfer, said first peak power transfer rate having a first upper and a first lower threshold for a desired state of charge, to fill the entire first predetermined duration of the power transfer opportunity;
during a second power transfer opportunity with a second predetermined duration of the power transfer opportunity, said second predetermined duration being larger than said first predetermined duration, where the energy storage device is at the first age and the first temperature, transfer power in to and/or out of the energy storage device with a second peak power transfer rate for a second duration of power transfer, said second peak power transfer rate being smaller than said first peak power transfer rate, said second duration of power transfer being larger than said first duration of power transfer, to fill the entire second predetermined duration of the power transfer opportunity; and
during a third power transfer opportunity, with the first predetermined duration of the power transfer opportunity, where the energy storage device is at a second age higher than the first age, and a second temperature higher than the first temperature, transfer power in to and/or out of the energy storage device with a third peak power transfer rate for the first duration of power transfer, said third peak power transfer rate being smaller than said first peak power transfer rate, to fill the entire first predetermined duration of the power transfer opportunity.

5. A system for a vehicle, comprising:
an energy storage device; and
a control system configured to,
during a first power transfer opportunity with a first predetermined duration of the power transfer opportunity, where the energy storage device is at a first age and a first temperature, transfer power in to and/or out of the energy storage device with a first power transfer rate for a first duration of power transfer, said first power transfer rate having a first upper and a first lower threshold for a desired state of charge, to substantially fill the first predetermined duration of the power transfer opportunity;
during a second power transfer opportunity with a second predetermined duration of the power transfer opportunity, said second predetermined duration being larger than said first predetermined duration, where the energy storage device is at the first age and the first temperature, transfer power in to and/or out of the energy storage device with a second power transfer rate for a second duration of power transfer, said second power transfer rate being smaller than said first power transfer rate, said second duration of power transfer being larger than said first duration of power transfer, to substantially fill the second predetermined duration of the power transfer opportunity; and
during a third power transfer opportunity, with the first predetermined duration of the power transfer opportunity, where the energy storage device is at a second age higher than the first age, and a second temperature higher than the first temperature, transfer power in to and/or out of the energy storage device with a third power transfer rate for the first duration of power transfer, said third power transfer rate being smaller than said first power transfer rate, to substantially fill the first predetermined duration of the power transfer opportunity, wherein the control system is further configured to, during the third power transfer opportunity, adjust a second upper threshold and a second lower threshold of the third power transfer rate, the adjustment including setting said second upper threshold lower than said first upper threshold and setting said second lower threshold higher than said first lower threshold.

6. A method for operating a vehicle including an energy storage device and a diesel-electric propulsion system, the method comprising:

during power transfer opportunities, predetermining a duration of each power transfer opportunity based on information of the power transfer opportunity, and adjusting a peak power transfer rate of the energy storage device based on the predetermined durations to thereby adjust actual durations of power transfers for achieving specified states of charge, the actual durations adjusted to match the predetermined durations of each of the power transfer opportunities, wherein during a first power transfer opportunity, power is transferred from the diesel-electric propulsion system to the energy storage device, and during a second power transfer opportunity, power is transferred from an alternate energy source than the diesel-electric propulsion system of the vehicle to the energy storage device.

7. The method of claim 6, wherein the power transferred from the diesel-electric propulsion system includes both dynamic braking energy and excess prime mover power.

8. The method of claim 1, wherein the vehicle energy storage device is included on a diesel-electric propulsion system, and wherein the peak power transfer rate in to and/or out of the vehicle energy storage device includes a peak power transfer rate of dynamic braking energy and excess prime mover power transferred from the diesel-electric propulsion system to the vehicle energy storage device.

* * * * *